United States Patent
Zhu et al.

(10) Patent No.: US 8,160,391 B1
(45) Date of Patent: Apr. 17, 2012

(54) PANORAMIC IMAGE FILL

(75) Inventors: Jiajun Zhu, Mountain View, CA (US); Abhijit Ogale, Mountain View, CA (US)

(73) Assignee: Google Inc., Mountain View, CA (US)

( * ) Notice: Subject to any disclaimer, the term of this patent is extended or adjusted under 35 U.S.C. 154(b) by 956 days.

(21) Appl. No.: 12/133,240

(22) Filed: Jun. 4, 2008

(51) Int. Cl.
*G06K 9/36* (2006.01)

(52) U.S. Cl. ..... 382/284; 345/629; 345/634; 348/211.3; 348/239; 348/36; 348/47; 358/444; 358/450; 382/154; 382/278; 382/294

(58) Field of Classification Search .................. None
See application file for complete search history.

(56) References Cited

U.S. PATENT DOCUMENTS

| | | | | |
|---|---|---|---|---|
| 5,465,163 A * | 11/1995 | Yoshihara et al. | ............. | 358/444 |
| 5,602,584 A * | 2/1997 | Mitsutake et al. | ............. | 348/47 |
| 5,680,150 A * | 10/1997 | Shimizu et al. | ............. | 345/634 |
| 5,721,624 A * | 2/1998 | Kumashiro et al. | ........... | 358/450 |
| 5,987,164 A * | 11/1999 | Szeliski et al. | ............. | 382/154 |
| 6,157,747 A * | 12/2000 | Szeliski et al. | ............. | 382/284 |
| 6,549,681 B1 * | 4/2003 | Takiguchi et al. | ........... | 382/294 |
| 6,677,982 B1 * | 1/2004 | Chen et al. | ........... | 348/36 |
| 6,687,419 B1 * | 2/2004 | Atkin | ............. | 382/284 |
| 6,717,614 B1 * | 4/2004 | Iida | ............. | 348/239 |
| 6,782,139 B2 * | 8/2004 | Bender et al. | ............. | 382/278 |
| 7,064,783 B2 * | 6/2006 | Colavin et al. | ............. | 348/231.3 |
| 7,076,116 B2 * | 7/2006 | Horie | ............. | 382/284 |
| 7,085,435 B2 * | 8/2006 | Takiguchi et al. | ............. | 382/294 |
| 7,092,012 B2 * | 8/2006 | Nakamura et al. | ........... | 348/211.3 |
| 7,162,102 B2 * | 1/2007 | Cahill et al. | ............. | 382/288 |
| 7,366,360 B2 * | 4/2008 | Takiguchi et al. | ............. | 382/284 |
| 2002/0154812 A1 * | 10/2002 | Chen et al. | ............. | 382/154 |
| 2003/0107586 A1 * | 6/2003 | Takiguchi et al. | ............. | 345/629 |
| 2006/0181619 A1 * | 8/2006 | Liow et al. | ............. | 348/239 |
| 2006/0188175 A1 * | 8/2006 | Takiguchi et al. | ............. | 382/284 |
| 2009/0021576 A1 * | 1/2009 | Linder et al. | ............. | 348/36 |

OTHER PUBLICATIONS

Brown, M., et al., "Recognising Panoramas", slide presentation, retrieved from: http://www.cs.ubc.ca/~mbrown/panorama/panorama.html, University of British Columbia, 2003, 63 pages.

Rodríguez, J., "Recognizing Panoramas", slide presentation, Texas A&M University, Oct. 2003, 18 pages.

Burt and Adelson, "A Multi-Resolutional Spline With Application to Image Mosaics", ACM Trans. Graphics, Oct. 1983 2(4), pp. 217-236.

\* cited by examiner

*Primary Examiner* — Anand Bhatnagar
*Assistant Examiner* — Tsung-Yin Tsai
(74) *Attorney, Agent, or Firm* — Sterne, Kessler, Goldstein & Fox P.L.L.C.

(57) ABSTRACT

Systems and methods for filling panoramic images having valid and invalid pixel regions are provided. An invalid region is identified in an initial panoramic image. Pixel data of invalid pixels in the initial panoramic image are replaced with pixel data of pixels from a valid region in at least one nearby panoramic image to obtain a valid fill region.

18 Claims, 14 Drawing Sheets

PANORAMIC IMAGE FILL

BACKGROUND

1. Field of the Invention

The present invention relates generally to panoramic imaging.

2. Background Art

A panoramic image has image data over a relatively wide angle of field of view of a scene. Panoramic images are increasingly being used to enrich a user experience in a wide variety of applications. For example, mapping services, terrain rendering services, photosharing services, web sites, and other services or applications are increasingly displaying panoramic images to users.

Creating panoramic images with valid data throughout an image area, however, can be difficult given the wide angle field of view. Obstructions or other undesirable objects may partially occlude a field of view. This is especially likely in certain panoramic images where one or more cameras are used to capture a wide angle field of a view of a scene. For example, to capture street-level imagery, multiple cameras aimed in different directions may be used to capture individual images of a scene. These individual images then are combined to create a panoramic image. Depending upon the particular camera arrangement, certain areas may be obstructed or not of interest. These areas can lead to invalid pixel data being present in a panoramic image. For example, in a situation where cameras are mounted on a moving vehicle to capture high-resolution images of a surrounding street scene, certain portions of the images near the ground may be blocked by a camera part or housing, or the vehicle itself, or may include the portions of vehicle when the vehicle is not of interest compared to the street-level imagery.

Photo editing applications, such as, Adobe Photoshop available from Adobe Systems Inc., allow images to be modified by a user to change pixel data and improve the user experience for a user viewing the modified image. However, these photo editing applications require significant time and effort by a user to manually identify and change invalid pixel data. Such photo editing applications are designed for general use and not equipped to handle a large volume of panoramic images.

BRIEF SUMMARY

Embodiments of the present invention relate generally to panoramic image fill and particularly to correcting invalid regions of panoramic images.

Embodiments of the present invention provide a computer-implemented method for filling panoramic images having valid and invalid pixel regions. The method includes identifying an invalid region in an initial panoramic image. The method further includes replacing pixel data of invalid pixels in the identified invalid region of the initial panoramic image based on pixel data of pixels from a valid region in at least one nearby panoramic image to obtain a valid fill region.

Other embodiments of the present invention provide a system for panoramic image fill of panoramic images having valid and invalid pixel regions. The system includes a filter and a pixel replacement module. The filter identifies an invalid region in an initial panoramic image. The pixel replacement module replaces pixel data of invalid pixels of the identified invalid region of the initial panoramic image based on pixel data of pixels from valid regions of at least one nearby panoramic image to obtain a valid fill region.

Embodiments of the present invention may be implemented using software, firmware, hardware or a combination thereof, and may be implemented in one or more computer systems or other processing systems.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements.

Figure 2:
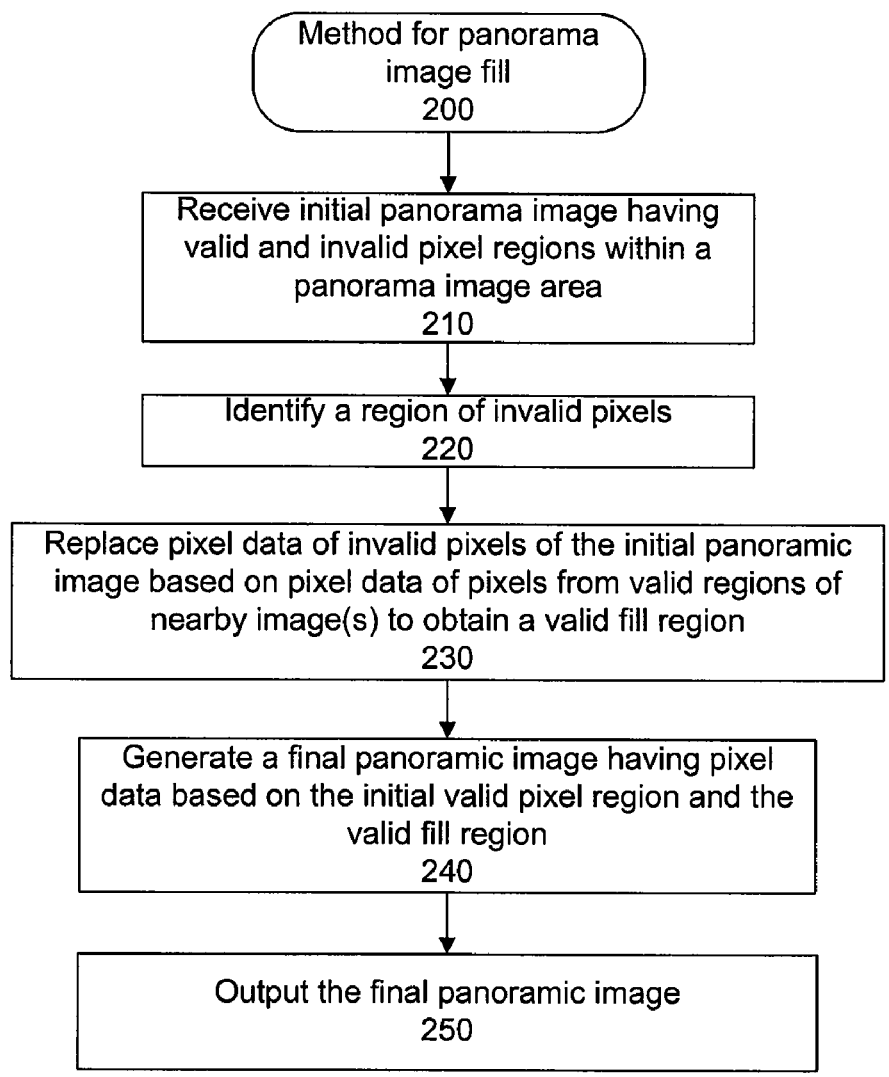
FIG. 2 is a flowchart illustrating a method for panoramic image fill in accordance with an embodiment of the invention.
Figure 5A:
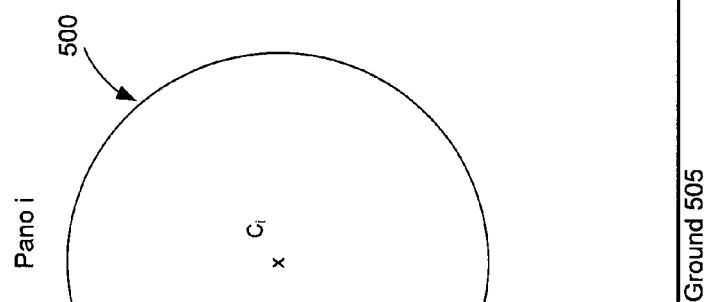
Figure 5B:
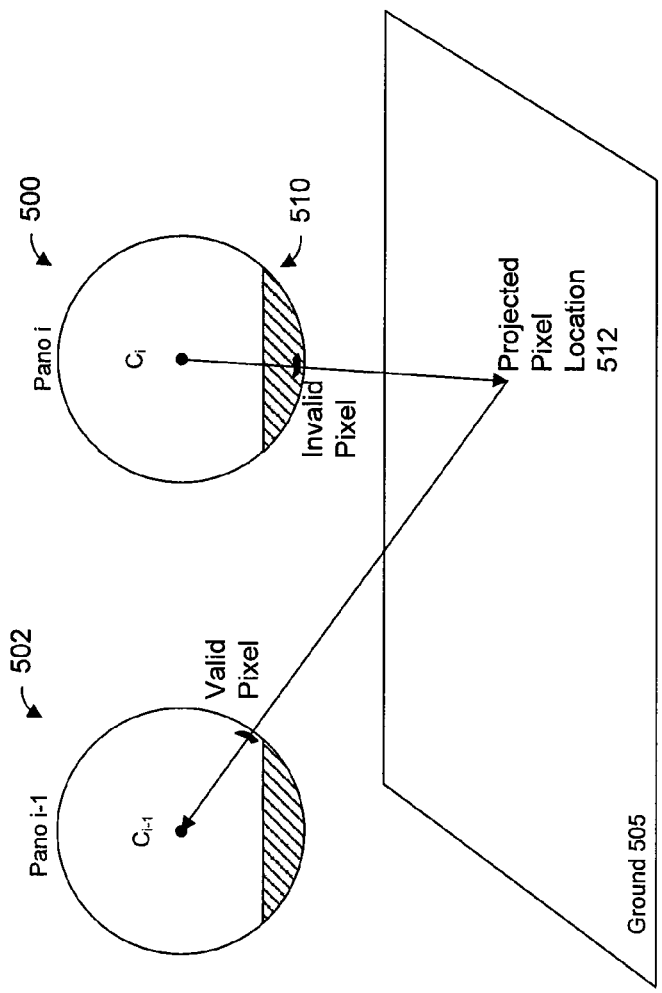
Figure 5C:
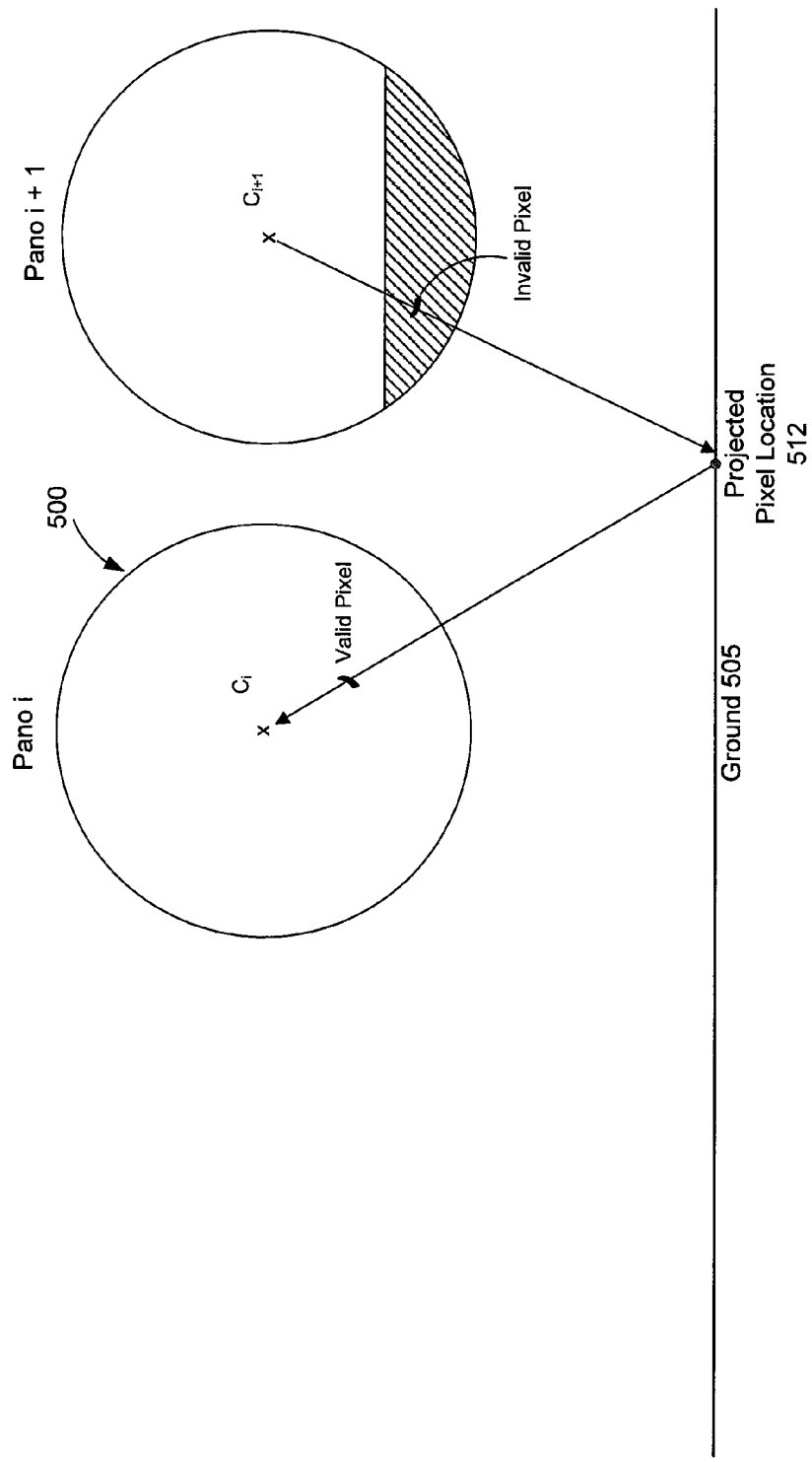

FIGS. 5A, 5B, and 5C illustrate examples of filling panoramic images according to the method of FIG. 2.

Figure 6:
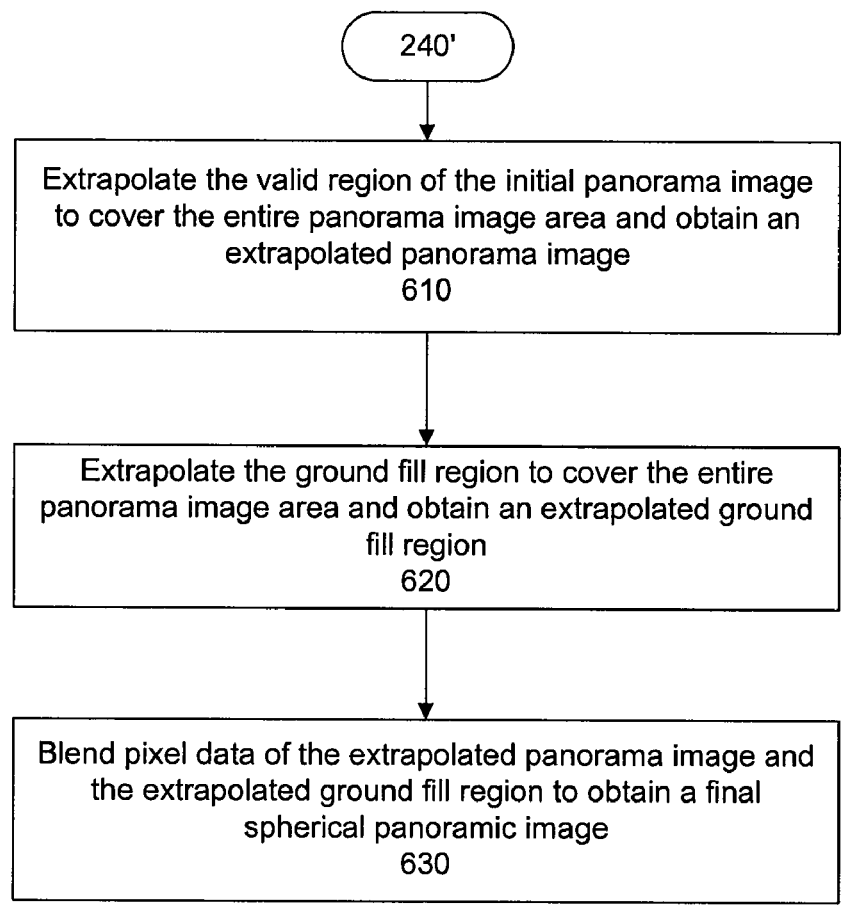

FIG. 6 is a flowchart illustrating extrapolation and blending of panoramic image data in accordance with a further embodiment of the invention.

Figure 7A:
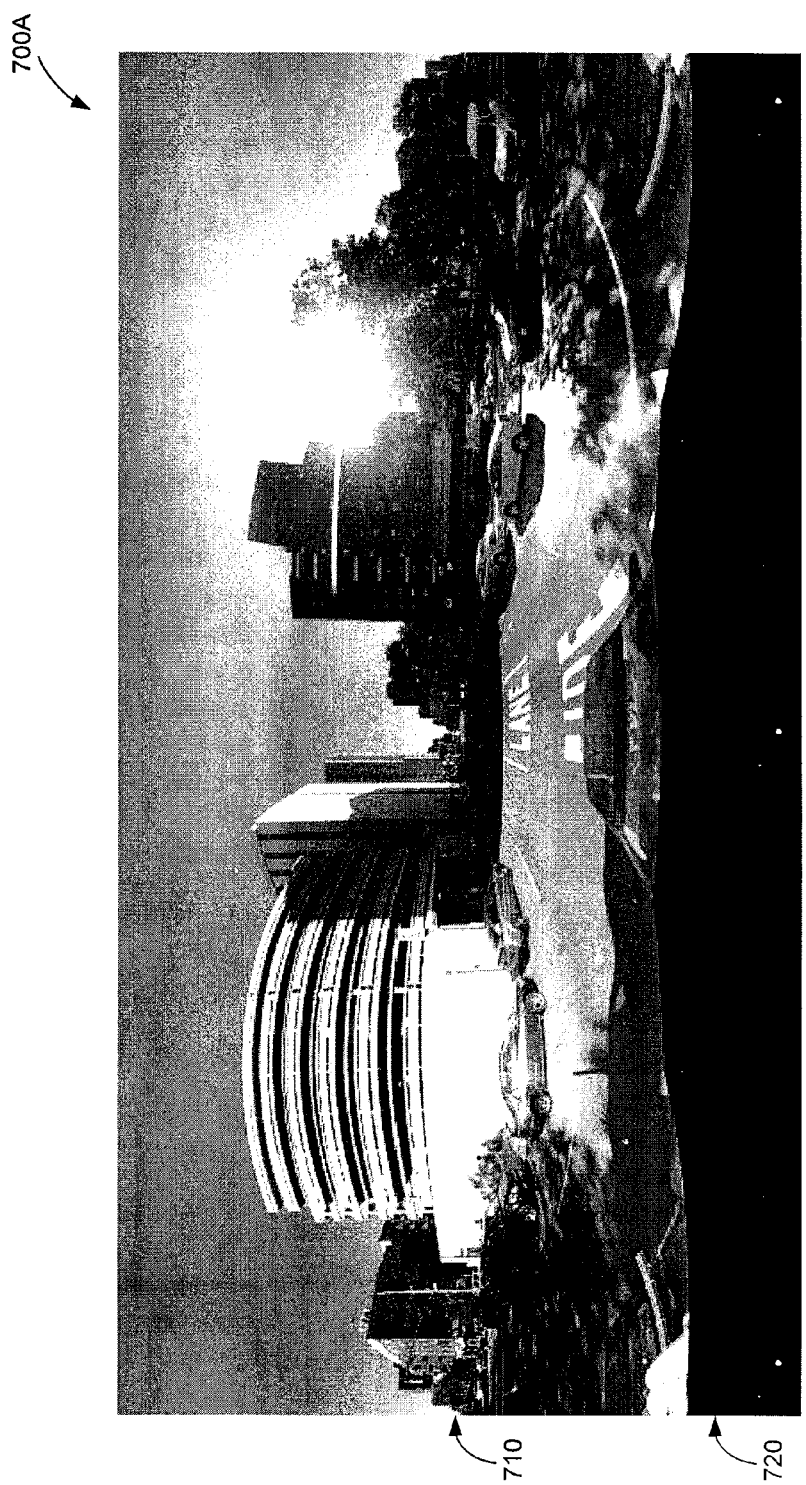
Figure 7B:
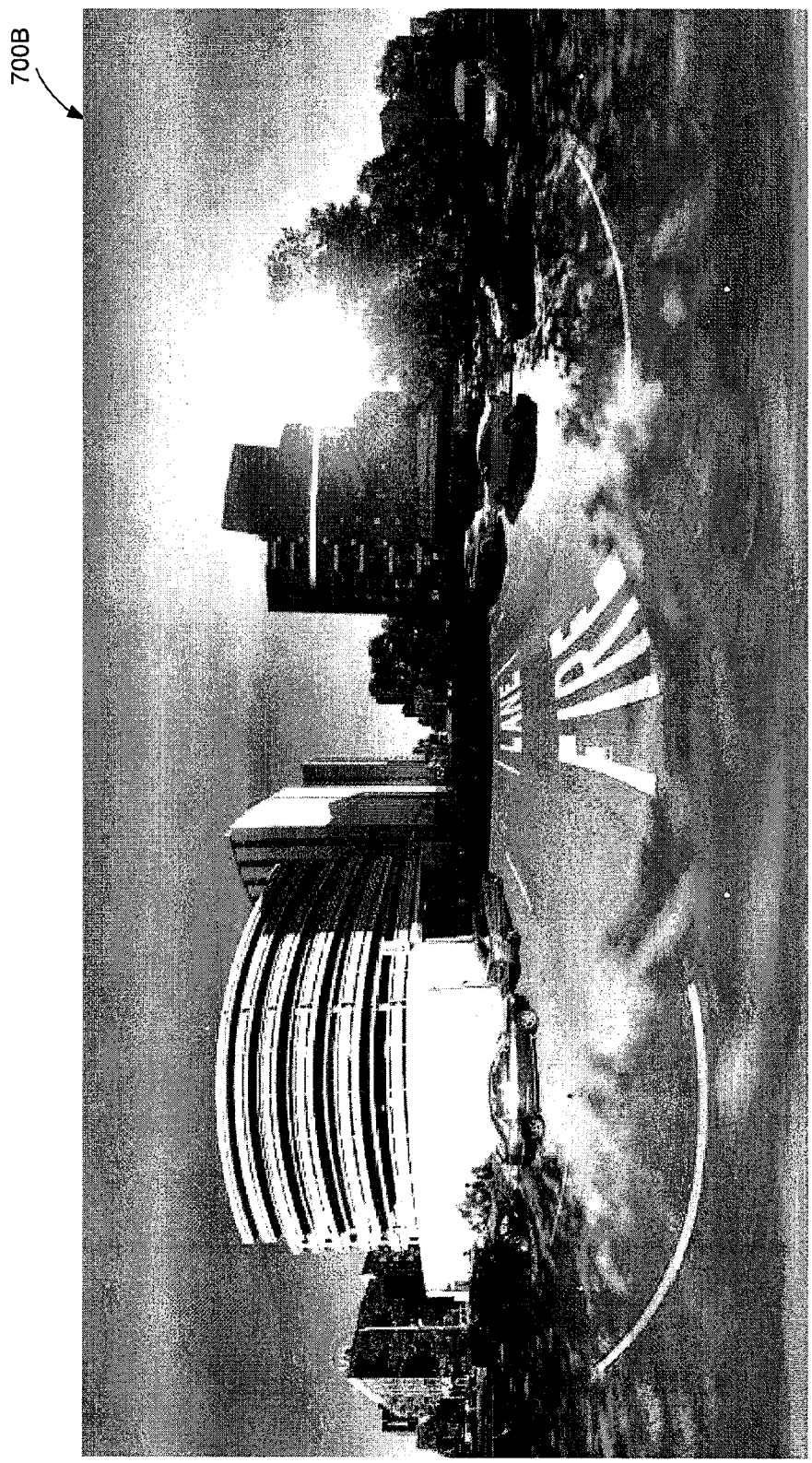

FIGS. 7A and 7B illustrate an example panoramic image before and after panoramic image fill with enhanced multi-band blending in accordance with an embodiment of the invention.

Figure 8A:
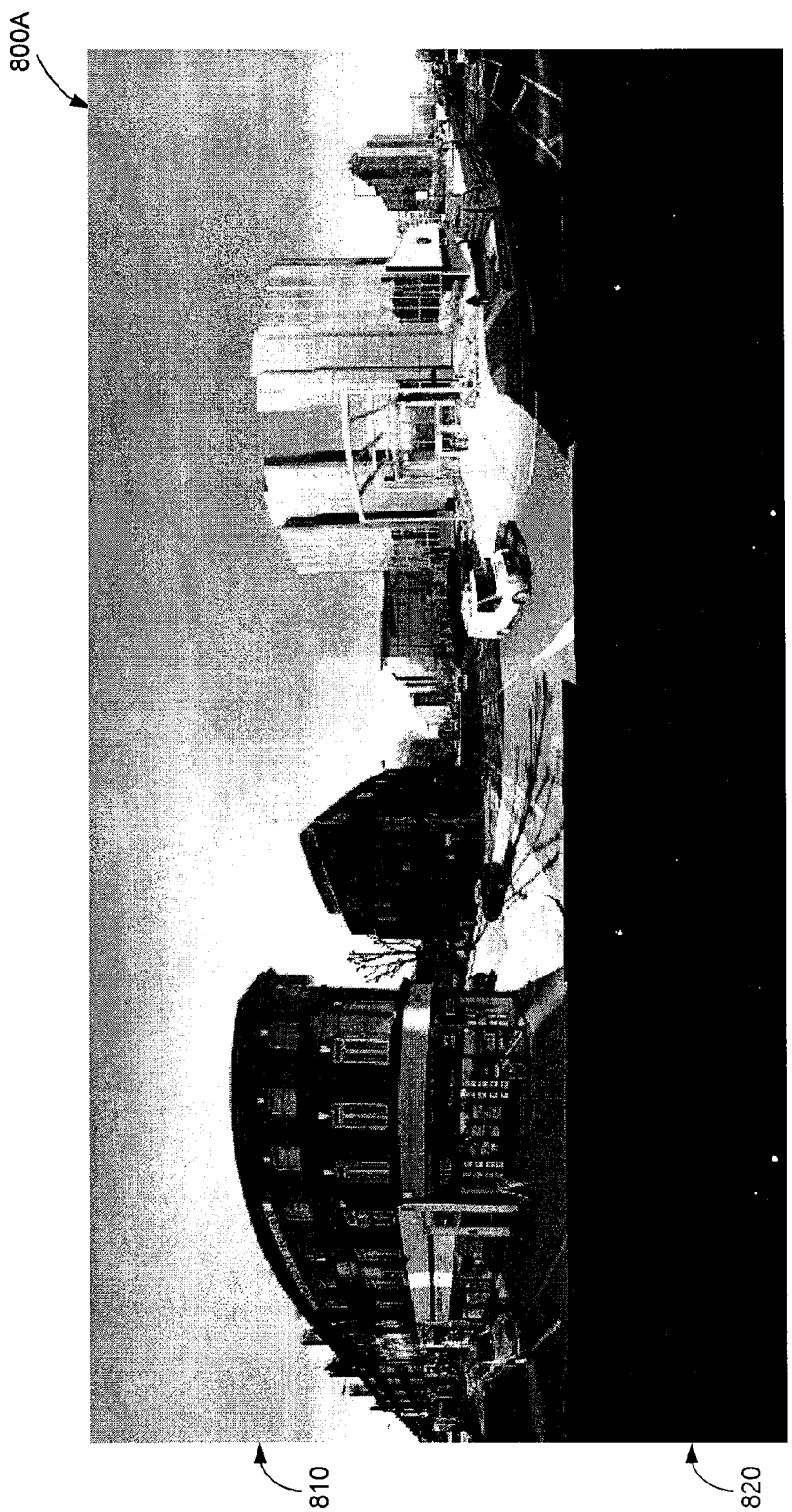
Figure 8B:
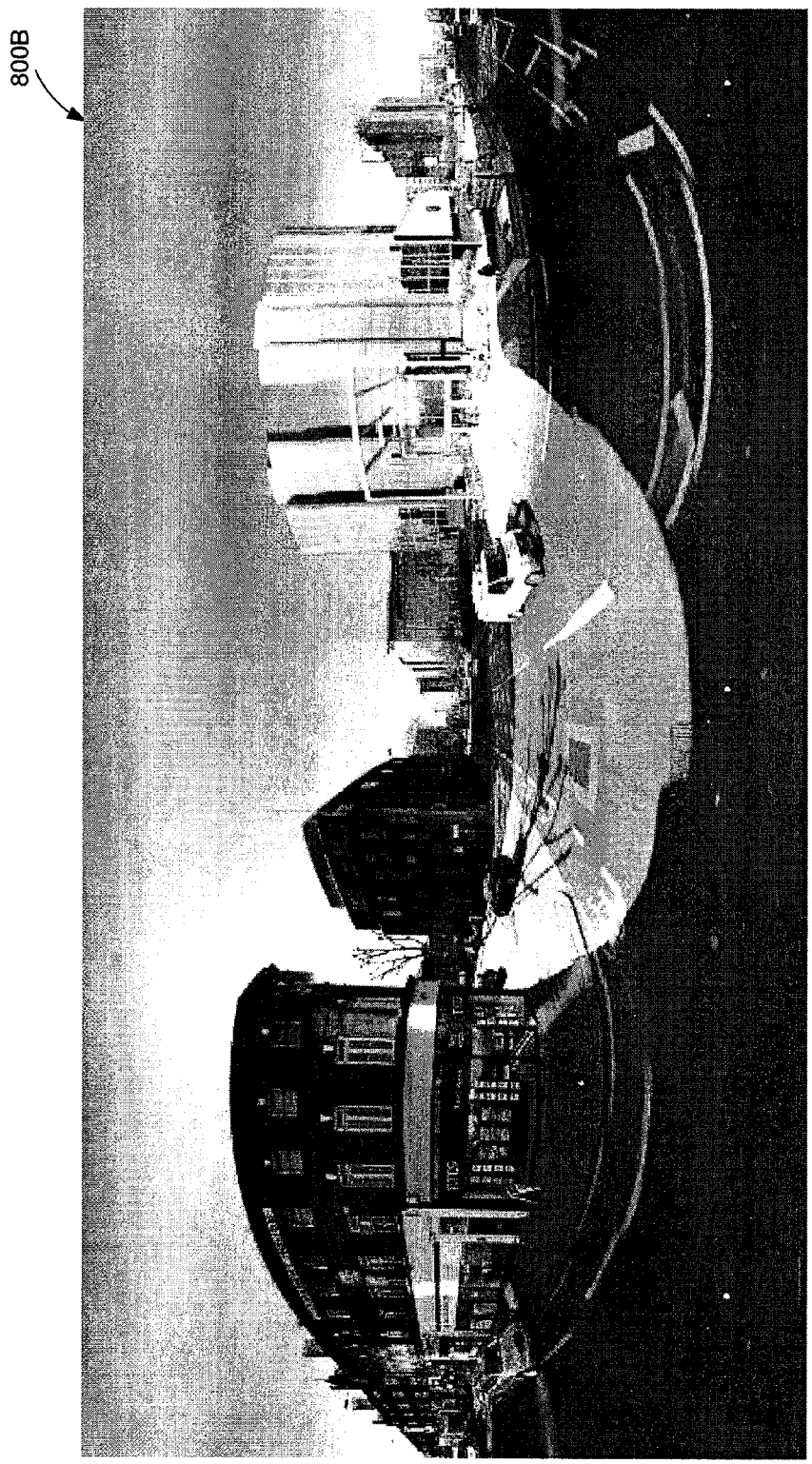

FIGS. 8A and 8B illustrate another example panoramic image before and after panoramic image fill with enhanced multi-band blending in accordance with an embodiment of the invention.

Figure 9A:
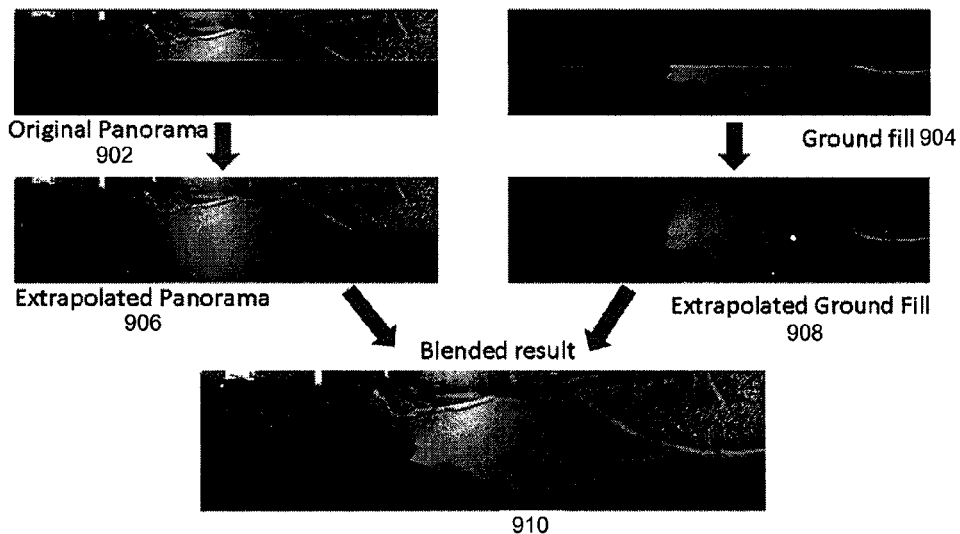
Figure 9B:
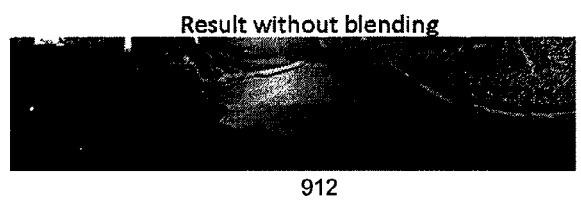

FIG. 9A illustrates example images including intermediate extrapolated and blended panoramic images obtained when performing panoramic image fill having enhanced multi-band blending in accordance with a further embodiment of the invention. FIG. 9B illustrates an example image obtained when performing panoramic image fill with no blending.

Figure 10:
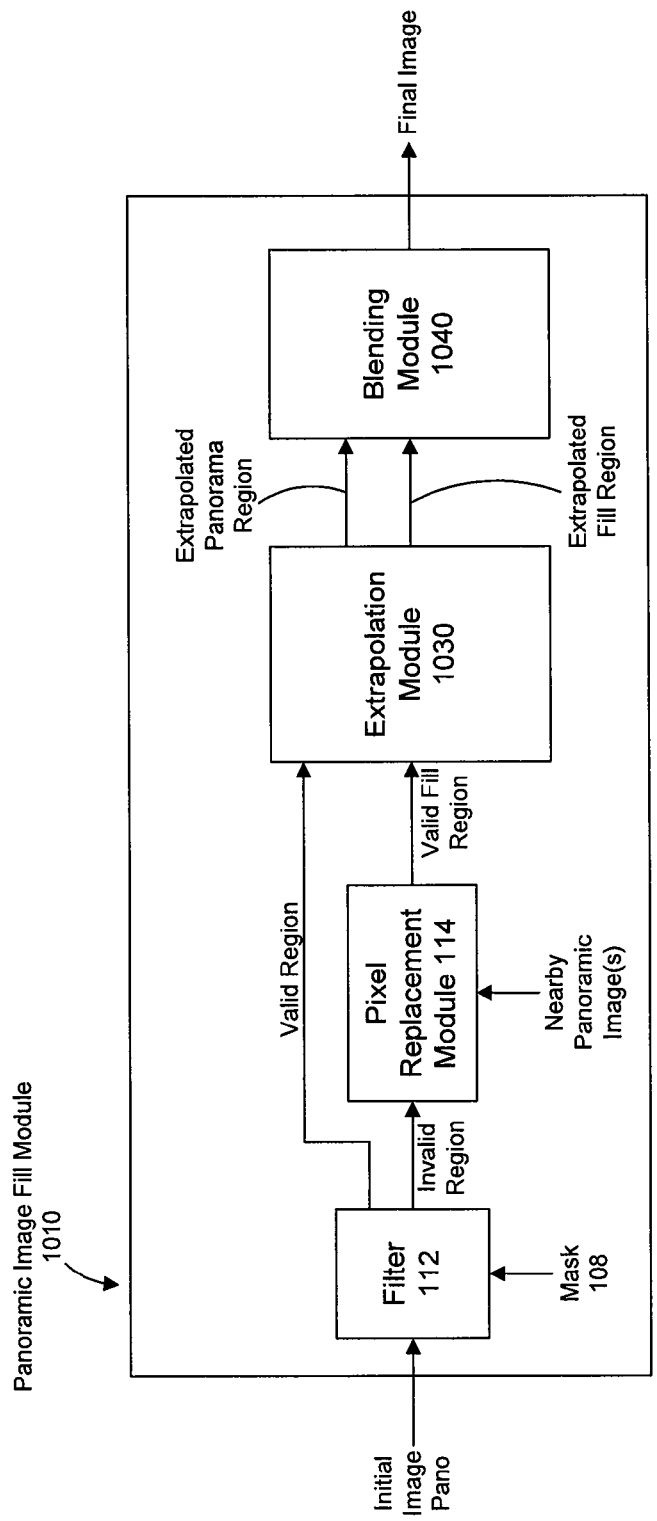

FIG. 10 is a diagram of an exemplary panoramic image fill system with extrapolation and multi-band blending in accordance with a further embodiment of the invention.

The present invention is described with reference to the accompanying drawings. The drawing in which an element first appears is typically indicated by the leftmost digit or digits in the corresponding reference number.

DETAILED DESCRIPTION

In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the present invention relate to panoramic image fill. Pixel data of valid pixels in one or more nearby panoramic image(s) are used to replace pixel data of invalid pixels of a panoramic image.

As used herein, the terms "pixel replacement" or "replace pixels" means to replace pixel data (also called values) of invalid pixels based on pixel data of valid pixels. For the pixel data of the invalid pixels involved, this pixel replacing can include, but is not limited to, assigning pixel values, associating pixel values, changing pixel values, or substituting pixel values. This pixel replacing can be performed alone, prior to, or as part of other image processing operations, such as, blending or enhanced blending, as described below.

Figure 1A:
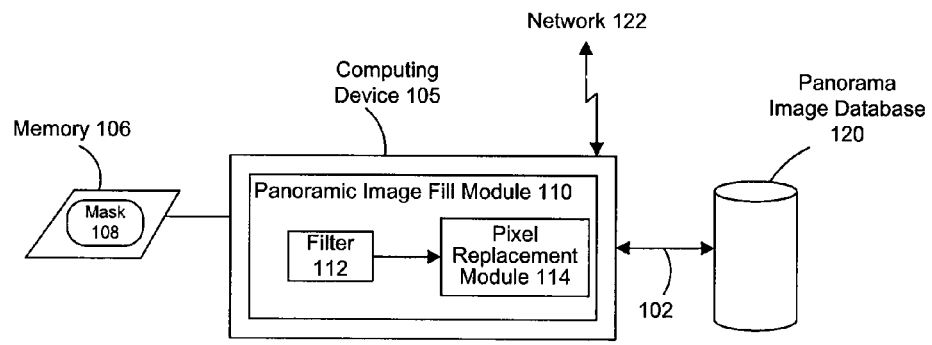
FIG. 1A is a diagram of a system to fill panoramic images in accordance with an embodiment of the invention.

FIG. 1A shows a system 100 for panoramic image fill according to an embodiment of the present invention. System 100 includes a computing device 105 coupled to a memory 106 and panoramic image database 120. Computing device 105 may also be coupled through a communications interface to a network 122. Network 122 can be any type of network including, but not limited to, a local area, medium area, or wide area network such as the Internet.

Computing device 105 can be any type of computing device having one or more processors. For example, computing device 105 can be a workstation, mobile device, computer, cluster of computers, set-top box, or other device having at least one processor. Computing device 105 can also be coupled over a link 102 to panoramic image database 120. Panoramic image database 120 can located at the same or a different location than computing device 105.

According to an embodiment, computing device 105 may include panoramic image fill module 110. Panoramic image fill module 110 includes filter 112 and pixel replacement module 114. In embodiments, panoramic image fill module 110, including its components (filter 112 and pixel replacement module 114), can be implemented in software, firmware, hardware, or any combination thereof.

Panoramic image database 120 can be any type of database or combination of networked or coupled databases. Panoramic image database 120 can store any type of panoramic image. Panoramic images can include, but are not limited to, an image covering a wide angle field of view. This can include spherical panoramic images that capture an image about a focal point which is at a center with a wide angle of view about the center. Pixels within a spherical panoramic image can further be represented on a surface of a three-dimensional sphere (this can be an entire surface of a 3D sphere or just a portion depending upon the image). Cylindrical, arcuate, rectilinear, polygonal or other types of panoramic images can also be used.

Figure 1B:
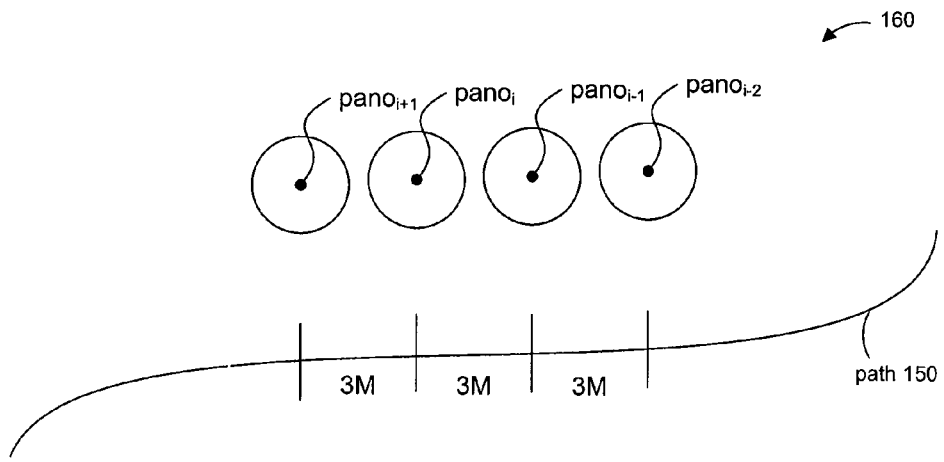
FIG. 1B shows an example series of nearby panoramic images captured along a path.

In an embodiment, panoramic image database 120 stores a series of panoramic images. These panoramic images can be spatially or temporally indexed. For example, the panoramic images may correspond to a succession of scenes taken along a path. FIG. 1B shows how a series of nearby panoramic images (pano$_{i+1}$, pano$_i$, pano$_{i-1}$, pano$_{i-2}$) 160 may have been captured by one or more cameras at different locations along a path 150.

These panoramic images may be near to one another such that nearby images include at least some overlap in the scenes being captured. For instance, as shown FIG. 1B, nearby panoramic images (pano$_i$+$_j$, pano$_i$, pano$_{i-j}$, pano$_{i-1}$) are separated by about 1-3 meters. This is only an example and not intended to limit the invention. Other spacings, including spacings larger or smaller than 1-3 meters, can be used depending upon a particular camera arrangement or desired application. Spacing can also be regular or varied along any shape path or at any different locations irrespective of a path.

Each panoramic image may have metadata. The metadata may include spatial and/or temporal data. For instance, if the panoramic images were taken at different locations they may be embedded with metadata that identifies at least a spatial position (such as, longitude and latitude) or temporal information (such as, a timestamp). In another example, the panoramic images may simply be placed in a sequential order indicative of which images are near one another, or they may have metadata which indicates a sequential order or identifies which images are nearby to other images.

In operation, panoramic image fill module 110 controls filter 112 and pixel replacement module 114 to provide fill for panoramic images stored in panoramic database 120. This fill can be performed automatically and efficiently as described herein.

Panoramic image fill module 110 receives an initial panoramic image (such as image pano$_i$). Filter 112 identifies an invalid region in the initial panoramic image. In one example, filter 112 can use a mask 108 stored in memory 106 to automatically identify an invalid region of pixels. Mask 108 can be set, built, or customized to identify one or more invalid regions of a panoramic image. Filter 112 then applies mask 108 to determine which pixels in the initial panoramic image lie in an invalid region and are referred to as invalid pixels.

Pixel replacement module 114 replaces pixel data of the invalid pixels of the identified invalid region of the initial panoramic image based on pixel data of pixels from valid regions of one or more nearby panoramic images (such as any of images pano$_{i-1}$, pano$_{i-2}$, pano$_{i+1}$) to obtain a valid fill region. Pixel replacement described herein is not limited to single pixel replacements. The replacement can be carried out for groups of pixels at a time, such as, a 4×4 block of pixels or cells. Furthermore, the region replaced by pixel replacement module 114 could be of any shape or size.

In one embodiment, pixel replacement module 114 replaces pixel data of an invalid pixel of the initial panoramic image with pixel data of a valid pixel of the at least one nearby panoramic image when the invalid and valid pixels project to about the same location on a common reference surface. This reference surface for example can be a surface, such as ground, common to both the initial panoramic image and the at least one nearby panoramic image. The ground can be represent by a plane having a fixed or varying height.

In one example, pixel replacement module 114 projects an invalid pixel of the initial panoramic image to a projected pixel location on the common reference surface. Pixel replacement module 114 then determines a projection point on a first nearby panoramic image based on the projected pixel location on the common reference surface. If the determined projection point corresponds to a valid region in the first nearby panoramic image, pixel replacement module 114 replaces the invalid pixel data in the initial panoramic image with valid pixel data corresponding to the pixel data associated with the projection point of the first nearby panoramic image. Pixel replacement module 114 may repeat this process for all the invalid pixels in the invalid pixel region of the initial panoramic image.

If any invalid pixels remain, pixel replacement module 114 may repeat this pixel replacement with other nearby panoramic images until all pixels in the invalid region are replaced with valid pixel data to obtain a valid fill region.

Once a valid fill region is obtained, panoramic image fill module 110 may generate a final panoramic image that includes pixel data based on the original valid pixel region and the valid fill region. In a further feature, this generating can include further processing such as, blending to remove artifacts. Such blending can include any suitable blending, such as, alpha blending or multi-band blending, to remove artifacts and improve image quality for a user. In a further feature, an enhanced multi-band blending extended with extrapolation and/or tiling may be used as described further below.

Panoramic image fill module 110 may then output the final panoramic image for display or storage. For instance, the final panoramic image may be output for storage in panoramic image database 120. The final panoramic image may then be served to or used by any application or service that uses panoramic images. For instance, a mapping service, such as Google Maps, a geographic information service, such as Google Earth, or a photosharing service, such as, Google Picasa, all available from Google, Inc., may serve or use the final panoramic images stored in panoramic image database 120 to provide an even richer user experience.

Figure 3:
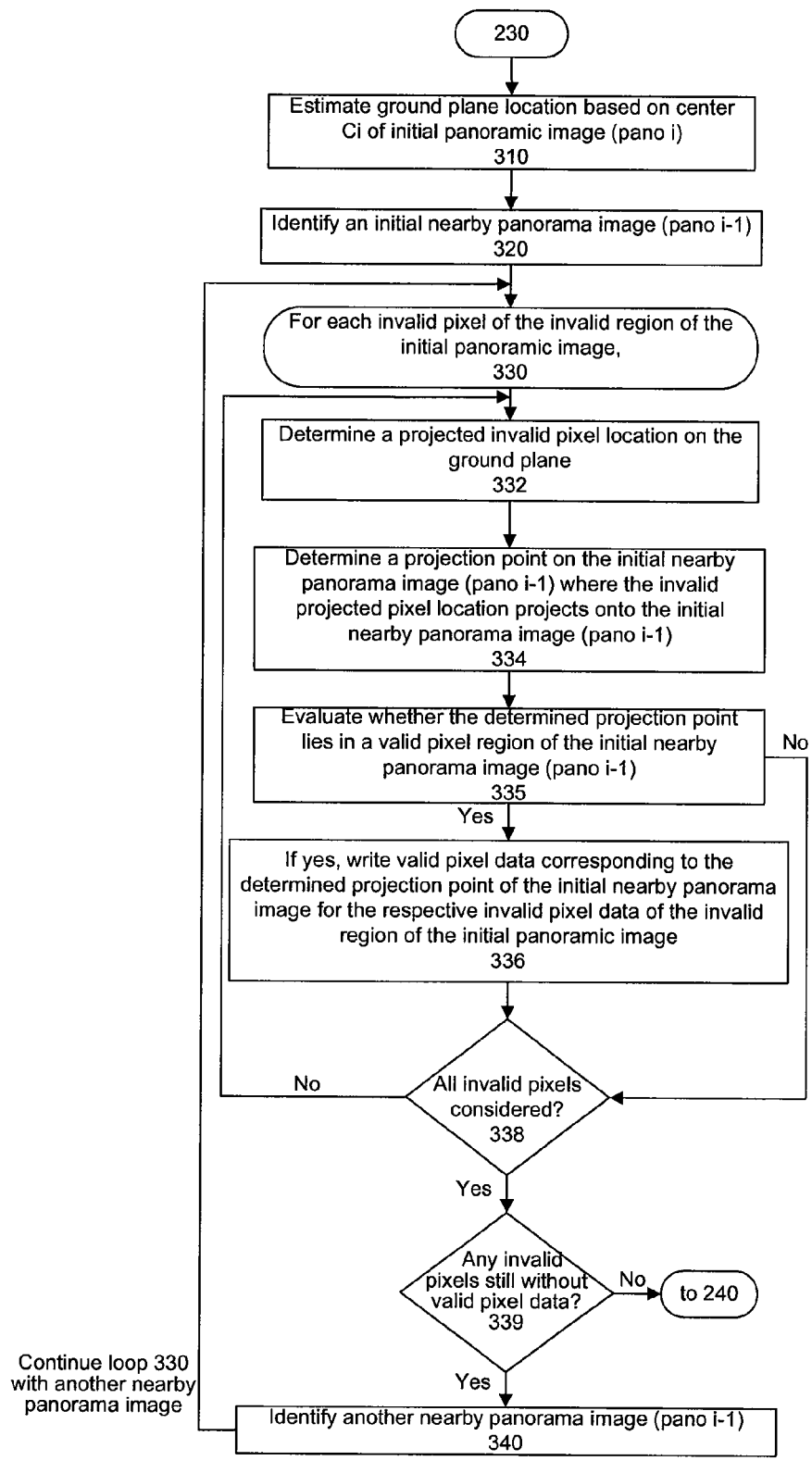
FIG. 3 is a flowchart illustrating invalid pixel replacing in accordance with an embodiment of the invention.
Figure 4:
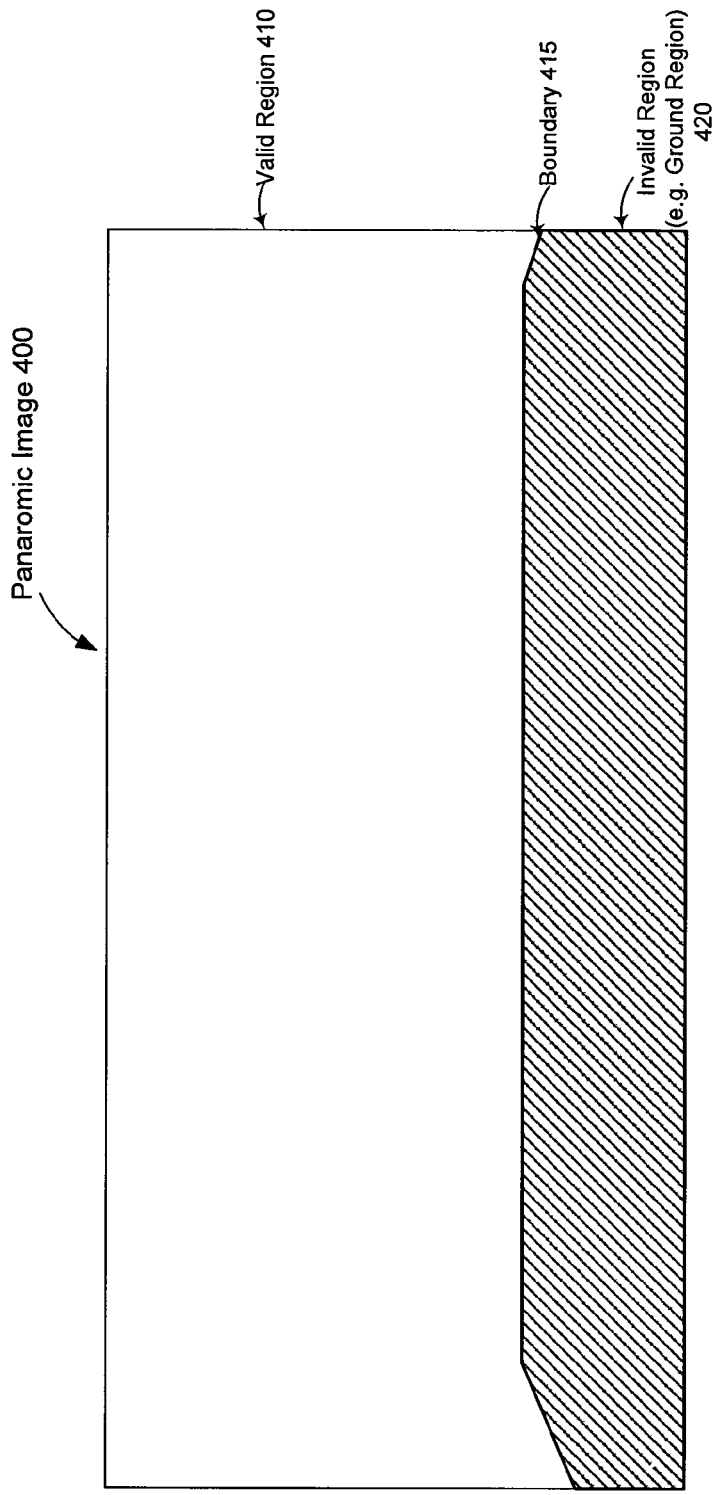
FIG. 4 illustrates an example of a panoramic image with valid and invalid regions.

The operation of panoramic image fill module 110, including filter 112 and pixel replacement module 114, are described in further detail below with respect to method 200 in FIGS. 2-3 and examples in FIGS. 4-5.

FIG. 2 is a flowchart illustrating a method for panoramic image fill 200 in accordance with an embodiment of the invention (steps 210-250). For brevity, method 200 will be described with reference to system 100 and examples in FIGS. 1B and 4-5 but is not intended to be so limited. Reference will also be made to examples of panoramic images with street scenery and invalid ground region but this is not intended to limit the invention.

Method 200 can be a computer-implemented method for fill of panoramic images having valid and invalid pixel regions. In an example, method 200 can be carried out by system 100. Steps 210 and 240-250 can be performed by panoramic image fill module 110. Steps 220 and 230 can be performed by filter 112 and pixel replacement module 114 respectively.

In step 210, an initial panoramic image having valid and invalid pixel regions within a panoramic image area is received. For example, as shown in FIG. 4, a panoramic image 400 may include a valid pixel region 410 and invalid pixel region 420 demarcated by a boundary 415. Valid region 410 may correspond to pixel data for scenery of interest, while invalid region 420 has pixel data not of interest (referred to here as invalid pixel data). For instance, such invalid pixel data can occur at the time a panoramic image is captured or created. For example, some panoramic images with street scenery may have been captured by mobile vehicles moving along a street. One or more cameras may be mounted on the vehicles to view a scene over a wide angle field of view about a center focal point. Invalid pixel region 420 may then include invalid pixel data due to blockage by shutters or camera housing and/or other pixels not of interest such as the parts of a vehicle itself near the ground.

In step 220, an invalid region of pixels in an initial panoramic image is identified. For instance, filter 112 may use a mask 108 to identify invalid region 420 near ground for certain panoramic images with street scenery. The mask 108 may be customized based on the shape of boundary 415 to identify the invalid ground region 420.

In step 230, pixel data of invalid pixels are replaced in the identified invalid region of the initial panoramic image based on pixel data of pixels from a valid region in at least one nearby panoramic image to obtain a valid fill region. Pixel replacement described herein is not limited to single pixel replacements. The replacement can be of groups of pixels at a time, such as a 4×4 block of pixels or cells. Furthermore, the region replaced in step 230 could be of any shape or size. In an embodiment, the invalid pixel data replacing may include replacing pixel data of an invalid pixel with pixel data of a valid pixel when the invalid pixel of the initial panoramic image and the valid pixel of the at least one nearby panoramic image each project to about the same location on a reference plane common to both the initial panoramic image and the at least one nearby panoramic image.

In a further embodiment, step 230 may include steps 310-340 as described below with respect to FIG. 3 and examples of FIGS. 1B and 5A-5C.

Consider a series of nearby panoramic images 160 having street scenery where a ground region is considered invalid. First, a ground plane location is estimated (step 310). This ground plane location may be estimated based on a center $C_i$ of an initial panoramic image $pano_i$. FIG. 5A shows an example of a ground 505 whose location may be estimated based on a center point $C_i$ of image $pano_i$ taken for a street scene above ground. 3D sphere 500 is merely illustrative to show panoramic image $pano_i$ may be associated with a scene captured with a wide angle field of view about center $C_i$ (this can include but is not limited to a spherical panoramic image). For instance, if spatial position metadata for a center point $C_i$ is present (or can be estimated) with image $pano_i$ and it is known that such an panoramic image was captured in a vehicle where an associated camera focal point was about 3 meters (m) high, then a ground plane location can be estimated to be 3 meters below the position of the panoramic image. In other examples, this ground plane location be an input or calculated differently depending upon available data (focal point data, spatial position of image, relative position of panoramic image relative to ground, etc.) as would be apparent to a person skilled in the art, given this description. A ground need not be a flat plane and in general any surface of fixed or varying height can be used.

In step 320, an initial nearby panoramic image $pano_{i-1}$, is identified. This can be any panoramic image sufficiently near the initial panoramic image to have some overlap in scenery of interest. For instance, this can be panoramic image $pano_{i-1}$ with a center point $C_{i-1}$ about 1-3 m. from the center point $C_i$ of initial image $pano_i$.

A loop 330 is then carried out for each invalid pixel of the invalid region of the initial panoramic image $pano_i$ (steps 332-339). First, a projected pixel location on a reference plane is determined (step 332). As shown in FIG. 5B, in the street scenery example of image $pano_i$, the reference plane can be a ground plane 505 at the ground location estimated in step 310. The image $pano_i$ is represented mathematically as a surface of a sphere 500 about the center $C_i$. Invalid pixel data is associated with an invalid region 510 of the surface of sphere. In one example, step 332 can be carried out by tracing a ray between a center $C_i$ of image $pano_i$ through the respective invalid pixel on a surface of a sphere 500 in an invalid region 510 to a projected pixel location 512 on ground 505 as shown in FIG. 5B.

Next, a projection point on the initial nearby panoramic image $pano_{i-1}$ where the invalid projected pixel location 512 projects onto the initial nearby panoramic image ($pano_{i-1}$) is determined (step 334). This projection point may be a point along a ray traced between the projected pixel location 512 on ground 505 and center $C_{i-1}$ that intersects a surface of a sphere 502 about center $C_{i-1}$ as shown in FIG. 5B.

In step 335, pixel replacement module 114 may evaluate whether the determined projection point lies in a valid pixel region of the initial nearby panoramic image $pano_{i-1}$. If yes, control proceeds to step 336 where valid pixel data corresponding to the determined projection point of the initial nearby panoramic image $pano_{i-1}$ may be written to replace the respective invalid pixel data of the invalid region of the initial panoramic image $pano_i$. As loop 330 proceeds, this pixel replacement fills the invalid region with valid pixel data to obtain a valid fill region. After the valid pixel data is written, control proceeds to step 338. If no, meaning the determined projection point also lies in an invalid region, then control proceeds to step 338.

In step 338, a check is made on whether all invalid pixels have been considered. If not, control returns to step 332 to the process a next invalid pixel. If yes, all invalid pixels have been considered, then control proceeds to step 339.

In step 339, a check is made on whether invalid pixels remain which have not been replaced with valid pixel data. If none remain, control proceeds to step 240. If yes, invalid pixels remain, control returns to step 340. In step 340, another nearby panoramic image $pano_{i-2}$ is identified. Control then proceeds to repeat loop 330 based on the another nearby panoramic image $pano_{i-2}$. Additional nearby spherical panoramic images can also be used in further successive iterations if needed until all remaining invalid pixels have pixel data replaced.

Returning to FIG. 2, once a valid fill region is obtained, a final panoramic image is generated (step 240). The final panoramic image can include pixel data based on the original valid pixel region and the valid fill region. This generating step 240 can include further processing such as, blending to remove artifacts. Such blending can include any suitable blending, such as, alpha blending or multi-band blending, to remove artifacts and improve image quality for a user.

The final panoramic image is then output for display or storage (step 250).

Note in a further optimization, once a final panoramic image is obtained that has a valid fill region, it can be used to quickly fill other nearby panoramic images. For instance, as shown in FIG. 5C, if image $pano_i$ has been filled as described above, it can used to fill a nearby panoramic image $pano_{i+1}$ even more quickly since all invalid pixels in the invalid region of $pano_{i+1}$ may be projected to valid pixels in the filled image $pano_i$ of FIG. 5C in a single pass. Even thousands of panoramic images in a sequence may be automatically filled such that almost all panoramic images, on average, only need to use one previously-filled panoramic image as a reference. This ground filling is then very efficient.

Enhanced Blending

According to a further feature, panoramic image fill may be carried out with enhanced blending that extends blending with extrapolation and/or tiling.

FIG. 6 is a flowchart illustrating a generating step 240' of extrapolation and blending of panoramic image data in accordance with a further embodiment of the invention. Generating step 240' is like step 240 described above but includes further steps of extrapolating (610-620) and blending (630) according to a feature of an embodiment of the present invention.

In step 610, pixel data in the valid pixel region of an original panoramic image is extrapolated to cover an entire area of the panoramic image. For instance, as shown in FIG. 9A, an original panoramic image 902 may have a valid pixel region with street scenery and an invalid pixel region near ground with invalid pixel data. In step 610, this valid pixel data is extrapolated over the entire area of the image to obtain an extrapolated panoramic image 906. Any type of extrapolation can be used to extrapolate the valid pixel data to obtain further pixel data that can be used in blending. This can include, but is not limited to, extrapolation that spills out low frequencies to obtain further pixel data that can be used in blending.

In step 620, pixel data in a valid ground fill region, obtained after step 230 as described above, is extrapolated to cover an entire area of the panoramic image as well. For instance, as shown in FIG. 9A, an image 904 with valid ground fill is extrapolated to cover an entire area of the panoramic image and obtain an extrapolated ground fill image 908. Any type of extrapolation can be used to extrapolate the valid pixel data to obtain further pixel data that can be used in blending. This can include, but is not limited to, extrapolation that spills out low frequencies to obtain further pixel data that can be used in blending.

In step 630, blending is performed on the extrapolated pixel data to obtain a final panoramic image 910. For example, blending may be carried out for pixel data in extrapolated panoramic image 906 and extrapolated ground fill image 908. Such blending can be any type of blending including but not limited to alpha blending or multi-band blending. FIG. 9A shows a final panoramic image 910 obtained multi-pass blending of extrapolated panoramic image 906 and extrapolated ground fill image 908 is performed. For example, such multi-pass blending can be performed according to the technique described by Burt and Adelson, "A multi-resolutional spline with application to image mosaics," ACM Trans. Graphics, October 1983 2(4).

This extrapolation and blending can be carried out quickly, removes artifacts, and further improves image quality and user experience of the final panoramic image compared to the case of no blending. For instance, FIG. 9B shows for comparison, a resultant final image 912 generated by only combining original panorama 902 and ground fill image 904 without performing extrapolation and blending.

While image 912 is an improvement over original panorama 902 with the presence of a valid ground fill region, certain noticeable artifacts or irregularities can still exist in the ground fill region. This may occur because different coloring, contrast and slight geometric misalignments can occur between nearby panoramic images. Blending reduces such artifacts. Enhanced multi-band blending with extrapolation as described herein is particularly advantageous and helps create a nearly seamless output panoramic image.

In a further feature, tiling may be used to operate on small portions of the sources images at time (i.e., the panoramic image region and ground fill image region). This can reduce RAM requirements and increase spend when carrying out extrapolation and multi-pass blending depending upon a particular computing device set up or configuration.

FIG. 10 is a diagram of an exemplary panoramic image fill module 1010 with enhanced blending in accordance with a further embodiment of the invention. Panoramic image fill module 1010 includes a filter 112, pixel replacement module 114, extrapolation module 1030 and blending module 1040. Panoramic image fill module 1010 can be implemented on computing device 105 in place of panoramic image fill module 110. Panoramic image fill module 1010 can be implemented in software, firmware, hardware or any combination thereof.

Panoramic image fill module 1010 receives an initial panoramic image. Filter 112 filters the initial panoramic image as described above based on a mask 108 and identify valid and invalid pixel regions. Pixel replacement module 114 replaces pixel data of the invalid pixels of the identified invalid region of the initial panoramic image with pixel data of pixels from valid regions of one or more nearby panoramic images to obtain a valid fill region as described above.

Extrapolation module 1030 then extrapolates pixel data in the valid pixel region of an original panoramic image and the valid fill region (as described with respect to steps 610-620) to obtain an extrapolated panoramic image region and extrapolated ground fill image region.

Blending module 1040 blends the extrapolated pixel data to obtain a final panoramic image. For example, blending module 1040 may blend pixel data in two source images (i.e., the extrapolated panoramic image region and the extrapolated ground fill image region). Such blending can be any type of blending including, but not limited to, alpha blending or multi-band blending, as described above with respect to step 630.

While extrapolation module 1030 and blending module 1040 are shown as separate modules they need not be separate. Extrapolating and blending operations may be combined when carrying out this processing of pixel data depending upon a particular implementation or design goal. Aspects of processing can also be pipelined where possible as desired.

Enhanced Multi-Band Blending with Extrapolation and/or Tiling

As mentioned above, after pixel replacement, further processing may be performed to generate a final panoramic image. According to a further feature, embodiments may include multi-band blending with significant extensions involving extrapolation and/or tiling. For instance, in further embodiments, a panoramic image fill module 110, 1010 may carry out an enhanced multi-band blending with significant extensions involving extrapolation and/or tiling as described herein.

Multi-band blending can be performed according to a technique described by Burt and Adelson, "A multi-resolutional spline with application to image mosaics," ACM Trans. Graphics, October 1983 2(4). The basic idea behind the technique is to treat each image as a sum of various spatial frequency channels (think of a Fourier transform). While blending, low frequency components are blended over a large distance, which causes things like the color of the sky or the color of the road to be blended very smoothly. Conversely, high frequencies are blended at very short distances, which preserves sharp features like edges. By keeping the smoothness of the blend inversely proportional to the frequencies, a smoothness of global color and contrast can be obtained while keeping the details sharp. The technique is called multi-band blending, because different frequency "bands" are blended separately.

In one example, each source image may be decomposed into a Laplacian pyramid of images. To construct the first level of this pyramid, a source image I0 may be first convolved with a Gaussian (which basically blurs the image) to get another image I0_gauss. Then, the first image in the Laplacian pyramid is set as I0_laplace=I0−I0_gauss. Control then proceeds to the next level of the pyramid. The image I0_gauss is sub-sampled by a factor of 2 to get image I1, which is half the size of I0_gauss. This process can then be repeated on I1 as performed on I0. The same process (blur, subtract, subsample) is kept repeating for each level of the pyramid, until an end is reached where no further subsampling may be done (i.e., either the height or width of Ig_small becomes 1 pixel). This constructs a Laplace pyramid.

Once the Laplace pyramids of source images A and B are constructed, a "blend mask" M can be specified which is a binary image (with 0 or 1 at each pixel). Pixels where M is 1 may indicate regions where priority should be given to image A, and where M is 0 may indicate regions where priority should be given to image B.

From the blend mask, a Gaussian "blend pyramid" can be constructed. The process of constructing a Gaussian pyramid is just like the process described above for the Laplace pyramid, except that I0_gauss, I1_gauss, I2_gauss, etc. denote the levels of the pyramid.

At each level k, the source Laplace images Ak_laplace and Bk_Laplace are blended together by using the blend mask Mk gauss, to give the result image in the form of a Laplace pyramid Rk_laplace.

To construct the result image R, the Laplace pyramid is collapsed starting from the bottom (i.e., the smallest image in the pyramid). This "collapse" process is the opposite of the Laplace pyramid construction process, and has the repeated steps upsample and add.

According to a feature, extensions to this multi-band blending may include tiling and/or extrapolation. Tiling may be used to operate on small portions of the extrapolated images at a time (i.e., the extrapolated panoramic image region and extrapolated ground fill image region). This can reduce RAM requirements and increase speed when carrying out multi-pass blending depending upon a particular computing device set up or configuration. In an example tested, the inventors found that, using the same source images, an efficient implementation of enhanced multi-blending with extrapolation and tiling may typically run 50 to 100 times faster than on an open-source implementation, Enblend version 3.0, which does not do extrapolation and tiling.

Extrapolation can involve spilling out low frequencies beyond the valid boundaries of a source image. In one example, this may be done during the creation of the Laplace pyramid described above by using only the valid regions of the image while blurring and downsampling, so that at each step, colors spill out beyond the valid portions of the image by a distance equal to the size of the Gaussian filter. Such extrapolation then allows blending even if there is hardly any overlap between the source images.

Further Examples

FIG. 7A and FIG. 7B illustrate an example panoramic image before and after panoramic image fill with enhanced multi-band blending with extrapolation and tiling in accordance with an embodiment of the invention. In FIG. 7A, panoramic image 700A includes a valid region 710 having street scenery of interest and an invalid region 720 having invalid pixel data not of interest. For instance, such invalid pixel data can occur at the time a panoramic image is captured or created. For example, some panoramic images with street scenery may have been captured by mobile vehicles moving along a street. One or more cameras may be mounted on the vehicles to view a scene over a wide angle field of view about a center focal point. In this example, 6-8 cameras may have been used to capture a 360 degree view about a center point including a view from ground to sky.

Invalid pixel region 720 may then include pixel data due to blockage by shutters or camera housing indicated by the all black pixels at the bottom of the image 700A and may include further pixels not of interest such as the parts of vehicle itself such as the front of the vehicle (hood and side mirrors) visible in FIG. 7A. In this example, a mask 108 may be customized to identify the invalid region 720. FIG. 7B shows an example final panoramic image 700B output by panoramic image fill module 1010. As shown, it is evident that invalid pixel data in region 720 has been filled with valid pixel data as described above. Enhanced multi-band blending extended with extrapolation and tiling was performed.

FIGS. 8A and 8B illustrate another example panoramic image 800 before and after panoramic image fill with enhanced multi-band blending with extrapolation and tiling in accordance with an embodiment of the invention. In FIG. 8A, panoramic image 800A includes a valid region 810 having street scenery of interest and an invalid region 820 having invalid pixel data not of interest. In this case, invalid pixel region 820 includes pixel data due to blockage by shutters or camera housing indicated by the all black pixels at the bottom of the image 800A.

In this example, a mask 108 may be customized to identify the invalid region 820. FIG. 8B shows an example final panoramic image 800B output by panoramic image fill module 1010. As shown, it is evident that invalid pixel data in region 820 has been filled with valid pixel data as described above. Enhanced multi-band blending extended with extrapolation and tiling was performed.

CONCLUSION

While various embodiments of the present invention have been described above, it should be understood that they have been presented by way of example, and not limitation. It will be apparent to persons skilled in the relevant art(s) that various changes can be made therein without departing from the scope of the invention.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer-implemented method for automatically filling in a panoramic image having an invalid pixel region, comprising:

estimating a reference surface common to an initial panoramic image and a nearby panoramic image;

representing the initial panoramic image on a surface of a first three-dimensional sphere;

representing the nearby panoramic image on a surface of a second three-dimensional sphere;

automatically identifying an invalid pixel in the initial panoramic image based on a mask associated with the initial panoramic image and the reference surface;

projecting the invalid pixel from a surface of the first three-dimensional sphere corresponding to the invalid pixel of the initial panoramic image onto a pixel location on the reference surface;

identifying a projection point on the surface of the second three-dimensional sphere corresponding to a valid pixel in the nearby panoramic image based on the pixel location on the reference surface; and automatically replacing pixel data of the invalid pixel of the initial panoramic image based on pixel data of pixels of the valid pixel in the nearby panoramic image.

2. The method of claim 1, wherein projecting the invalid pixel from a surface of the first three-dimensional sphere corresponding to the invalid region of the initial panoramic image onto a pixel location on the reference surface, comprises projecting the invalid pixel alone a first ray traced from a center point of the first three-dimensional sphere to the pixel location on the reference surface; and identifying a projection point on the surface of the second three-dimensional sphere comprises identifying a projection point on the surface of the second three-dimensional sphere corresponding to a valid pixel in the nearby panoramic image based on a second ray traced from the pixel location on the reference surface to a center point of the second three-dimensional sphere.

3. The method of claim 1 wherein the reference surface corresponds to a ground surface of the initial panoramic image, and the invalid region of the initial panoramic image comprises a ground region.

4. The method of claim 3, further comprising estimating the location of the ground surface based on the location of the center of the initial panoramic image.

5. The method of claim 1, further comprising generating a final panoramic image having pixels with pixel data based on the initial valid pixel region and the valid fill region.

6. The method of claim 5, further comprising outputting the final panoramic image.

7. The method of claim 5, wherein the generating includes blending pixel data in the valid pixel region and valid fill region to obtain the final panoramic image.

8. The method of claim 7, wherein the generating further includes:
    (a) extrapolating pixel data in the valid pixel region and valid fill region; and
    (b) blending the extrapolated pixel data to obtain the final panoramic image.

9. The method of claim 8, wherein the blending comprises multi-band blending.

10. A system for filling automatically filling in a panoramic image having an invalid pixel region, comprising:

a pixel replacement module configured to replace pixel data of invalid pixels of an invalid region of an initial panoramic image with pixel data of pixels from valid regions of a nearby panoramic image by a process comprising:

estimating a reference surface common to the initial panoramic image and the nearby panoramic image;

representing the initial panoramic image on a surface of a first three-dimensional sphere;

representing the nearby panoramic image on a surface of a second three-dimensional sphere;

automatically identifying an invalid pixel in the initial panoramic image based on a mask associated with the initial panoramic image and the reference surface;

projecting the invalid pixel from a surface of the first three-dimensional sphere corresponding to the invalid pixel of the initial panoramic image onto a pixel location on the reference surface;

identifying a projection point on the surface of the second three-dimensional sphere corresponding to a valid pixel in the nearby, panoramic image based on the pixel location on the reference surface; and automatically replacing pixel data of the invalid pixel of the initial panoramic image based on pixel data of pixels of the valid pixel in the nearby panoramic image.

11. The system of claim 10, wherein the pixel replacement module is configured to:

project the invalid pixel from a surface of the first three-dimensional sphere corresponding to the invalid region of the initial panoramic image onto a pixel location on the reference surface by projecting the invalid pixel alone a first ray traced from a center point of the first three-dimensional sphere to the pixel location on the reference surface; and identify a projection point on the surface of the second three-dimensional sphere by identifying a projection point on the surface of the second three-dimensional sphere corresponding to a valid pixel in the nearby panoramic image based on a second ray traced from the pixel location on the reference surface to a center point of the second three-dimensional sphere.

12. The system of claim 10, wherein the reference surface corresponds to a ground surface of the initial panoramic image, and the invalid region of the initial panoramic image comprises a ground region.

13. The system of claim 12, wherein the pixel replacement module is configured to estimate the reference surface location of the ground surface based on the location of a center of the initial panoramic image.

14. The system of claim 10, wherein a final panoramic image is output having pixel data based on the initial panoramic image and the nearby panoramic image.

15. The system of claim 10, further comprising a blending module that blends pixel data in the initial panoramic image and the nearby panoramic image to obtain a final panoramic image.

16. The system of claim 10, further comprising:
an extrapolation module that extrapolates pixel data in the valid pixel region and valid fill region; and
a blending module that blends the extrapolated pixel data to obtain the final panoramic image.

17. The system of claim 16, wherein the blending module performs multi-band blending to blend the extrapolated pixel data.

18. A computer program product comprising a computer readable storage medium having computer program logic recorded thereon to perform a method of automatically filling in a panoramic image having an invalid pixel region, comprising:
estimating a reference surface common to an initial panoramic image and a nearby panoramic image;
representing the initial panoramic image on a surface of a first three-dimensional sphere;
representing the nearby panoramic image on a surface of a second three-dimensional sphere;
automatically identifying an invalid pixel in the initial panoramic image based on a mask associated with the initial panoramic image and the reference surface;
projecting the invalid pixel from a surface of the first three-dimensional sphere corresponding to the invalid pixel of the initial panoramic image onto a pixel location on the reference surface;
identifying a projection point on the surface of the second three-dimensional sphere corresponding to a valid pixel in the nearby panoramic image based on the pixel location on the reference surface; and
automatically replacing pixel data of the invalid pixel of the initial panoramic image based on pixel data of pixels of the valid pixel in the nearby panoramic image.

* * * * *

UNITED STATES PATENT AND TRADEMARK OFFICE
CERTIFICATE OF CORRECTION

PATENT NO. : 8,160,391 B1
APPLICATION NO. : 12/133240
DATED : April 17, 2012
INVENTOR(S) : Zhu et al.

It is certified that error appears in the above-identified patent and that said Letters Patent is hereby corrected as shown below:

Column 3, Line 61, please replace "images ($\mathbf{pano}_{i+i}$, $pano_i$, $\mathbf{pano}_{i-i}$, $\mathbf{pano}_{i-1}$) are" with --images ($\mathbf{pano}_{i+1}$, $pano_i$, $\mathbf{pano}_{i-1}$, $\mathbf{pano}_{i-2}$) are--.

Signed and Sealed this
Thirty-first Day of July, 2012

David J. Kappos
*Director of the United States Patent and Trademark Office*